US012503604B2

(12) United States Patent
Sasaki et al.

(10) Patent No.: US 12,503,604 B2
(45) Date of Patent: Dec. 23, 2025

(54) DEEP BLUISH-BLACK EFFECT PIGMENTS

(71) Applicant: Merck Patent GmbH, Darmstadt (DE)

(72) Inventors: Fumiko Sasaki, Iwaki (JP); Kirsten Fritsche, Darmstadt (DE); Masayuki Momose, Moka (JP); Michael Jungnitz, Dreieich (DE)

(73) Assignee: Susonity Commercial GmbH, Gernsheim (DE)

( * ) Notice: Subject to any disclaimer, the term of this patent is extended or adjusted under 35 U.S.C. 154(b) by 558 days.

(21) Appl. No.: 17/439,187

(22) PCT Filed: Mar. 12, 2020

(86) PCT No.: PCT/EP2020/056620
§ 371 (c)(1),
(2) Date: Sep. 14, 2021

(87) PCT Pub. No.: WO2020/187682
PCT Pub. Date: Sep. 24, 2020

(65) Prior Publication Data
US 2022/0162449 A1 May 26, 2022

(30) Foreign Application Priority Data
Mar. 15, 2019 (EP) .................... 19163126

(51) Int. Cl.
*C09C 1/00* (2006.01)
*C01G 49/04* (2006.01)
*C01G 49/06* (2006.01)
*C01G 49/08* (2006.01)
*C09D 17/00* (2006.01)

(52) U.S. Cl.
CPC ............ *C09C 1/0039* (2013.01); *C01G 49/04* (2013.01); *C01G 49/06* (2013.01); *C01G 49/08* (2013.01); *C09D 17/007* (2013.01); *C01P 2004/54* (2013.01); *C01P 2004/61* (2013.01); *C01P 2006/62* (2013.01); *C01P 2006/64* (2013.01); *C09C 2200/1004* (2013.01); *C09C 2200/102* (2013.01); *C09C 2200/301* (2013.01); *C09C 2200/302* (2013.01); *C09C 2200/306* (2013.01); *C09C 2200/401* (2013.01); *C09C 2200/402* (2013.01); *C09C 2210/60* (2013.01); *C09C 2220/106* (2013.01)

(58) Field of Classification Search
CPC ...... C09C 1/0039; C01G 49/04; C01G 49/06; C01G 49/08; C09D 17/007; C01P 2004/54; C01P 2004/61; C01P 2006/62; C01P 2006/64
See application file for complete search history.

(56) References Cited

U.S. PATENT DOCUMENTS

| | | | |
|---|---|---|---|
| 3,926,659 A | 12/1975 | Bernhard et al. | |
| 4,867,793 A | 9/1989 | Franz et al. | |
| 5,702,519 A | 12/1997 | Nitta et al. | |
| 6,238,471 B1 | 5/2001 | Vogt et al. | |
| 6,630,018 B2 | 10/2003 | Bauer et al. | |
| 7,303,622 B2 | 12/2007 | Loch et al. | |
| 9,657,185 B2 | 5/2017 | Shimizu et al. | |
| 10,253,191 B2 | 4/2019 | Shimizu et al. | |
| 2004/0038355 A1 | 2/2004 | Vogt et al. | |
| 2012/0237577 A1 | 9/2012 | Sioss et al. | |
| 2013/0257035 A1* | 10/2013 | Shimizu ............... | B42D 15/00 252/62.59 |
| 2017/0321058 A1* | 11/2017 | Rueger ............ | C04B 35/62839 |

FOREIGN PATENT DOCUMENTS

| | | |
|---|---|---|
| CN | 1229110 C | 11/2005 |
| CN | 103403102 B | 8/2015 |
| CN | 107124885 B | 11/2019 |
| DE | 3617430 A1 | 11/1987 |
| DE | 10065761 A1 | 7/2002 |
| EP | 0763573 B1 | 7/2001 |
| JP | 2014503626 A | 2/2014 |
| WO | 9308237 A1 | 4/1993 |
| WO | 12076110 A1 | 6/2012 |
| WO | 12084097 A1 | 6/2012 |

OTHER PUBLICATIONS

International Search Report PCT/EP2020/056620 dated Jun. 8, 2020 (pp. 1-3).
English translation of Office Action in the corresponding patent application JP 2021553274 dated Feb. 29, 2024 (2 pages).

* cited by examiner

*Primary Examiner* — Pegah Parvini
(74) *Attorney, Agent, or Firm* — Csaba Henter; MILLEN, WHITE, ZELANO & BRANIGAN

(57) ABSTRACT

The present invention is related to effect pigments exhibiting a deep black body color as well as a blue interference color, to a process for the production of such pigments as well as to the use thereof, especially in coating compositions.

19 Claims, No Drawings

DEEP BLUISH-BLACK EFFECT PIGMENTS

The present invention is related to effect pigments exhibiting a deep black body color as well as a blue interference color, to a process for the production of such pigments as well as to the use thereof, especially in coating compositions.

The bluish-black effect pigments of the present invention are particularly useful for decorative and automotive applications, where neutral deep black body colors of pigments with high luster and an intense bluish interference color are strongly desired. Of course, they may also be used in other fields where either their color properties, also in combination with colored pigments of any kind, or their magnetic properties which they additionally exhibit, might be of interest, in particular in printing inks.

Besides colored pigments with attractive colors, black pigments exhibiting a deep black absorption color as well as high luster have been desired for a long time. Traditionally, carbon black pigments have been used in automotive applications, decorative applications or printing applications, to name only a few.

Unfortunately, carbon black absorption pigments do not exhibit any luster and must be combined with lustrous pigments to get a lustrous black colored appearance of the corresponding product, whereby the black color is diminished.

Therefore, there have been attempts to replace non-lustrous carbon black pigments by lustrous black pigments not containing carbon black.

U.S. Pat. No. 3,926,659 discloses mica pigments which are optionally coated with $TiO_2$ or $ZrO_2$ or hydrates thereof, having a uniform iron containing layer thereon, which may be of alpha iron oxide (hematite, $Fe_2O_3$) or of magnetite ($Fe_3O_4$). The coloristic properties of these pigments are mostly due to the interference color produced by the $TiO_2$ or $ZrO_2$ layer, which is slightly shifted by the application of an alpha iron oxide layer thereon. Their body color is, depending on the layer thickness of the alpha iron oxide layer, a warm reddish-brown hue. In case a magnetite layer is produced on top of the $TiO_2$ or $ZrO_2$ layer, the interference color produced by the underlying layer is reinforced by a thin black magnetite layer or superimposed by a thick magnetite layer. Pigments having a thick magnetite layer lose their luster, because the magnetite layer is said to be rough due to the crystalline configuration thereof which results from the respective production method.

Pigments of this type do not fulfil the requirements of exhibiting a strong black absorption color combined with a good hiding power as well as an attractive luster.

In DE 100 65 761 A1 flaky magnetic particles are described, which are multi-layered and contain a core comprising $Al_2O_3$ or a mixed phase of $Al_2O_3$ and $SiO_2$, an intermediate layer of amorphous $SiO_2$ and a shell containing iron, the latter may, inter alia, contain magnetite or hematite. These particles are coated with inorganic or organic coupling agents being able to react with nucleic acids or proteins for isolation thereof in aqueous solutions. Since these pigments are made from aluminum powders by suspension in water and adding water soluble silicatic compounds, the cores thereof are not of homogeneous composition, but of mixed oxides of aluminum and silicon instead, optionally with remainings of aluminum metal. In addition, since the core material decomposes at least partly, the platy shape of the particles and a smooth surface thereof may not be maintained in the resulting pigment. Furthermore, the control of the production process is difficult, since the reaction of aluminum powder in water is highly exothermic per se and since the following reaction with iron compounds is dangerous as well (thermite process). The coloristic properties of these pigments are not described and do not play any role for the intended purpose.

In DE 3617430, platy colored pigments are described, which are composed of a platy substrate of mica, glass, metal or graphite, especially of mica, which may be pre-coated with a metal oxide layer and comprise a compact Fe (II) containing layer either directly on the substrate or on the metal oxide layer. An additional covering layer is also possible. The Fe (II) containing layer may be of $Fe_3O_4$ and is described to be dense and compact, which is due to the particular reduction method for the production of these pigments. The resulting pigments exhibit a black body color in combination with interference colors.

U.S. Pat. No. 7,303,622 discloses lustrous black interference pigments based on a substrate mixture of fine and rough substrate particles, which have a coating of $Fe_3O_4$, a colorless low refractive coating thereon, as well as optionally an absorbent, high refractive index material thereon which only covers part of the surface, as well as optionally a further layer which is a protective layer. As a preferred substrate, mica of different particle size ranges (fractions obtained by classification of the pigments) is used. The resulting pigment mixture is said to exhibit a black body color as well as high luster. The pigment mixture is furthermore said not to produce a pronounced goniochromaticity (angle dependent interference color).

Although the pigments according to the latter two prior art documents exhibit a somewhat lustrous black appearance, there is still a need for black effect pigments exhibiting a neutral deep black body color and a still higher luster and chroma than the pigments of the prior art, which do, in addition, possess a bluish interference color and a good stability in application media, do not exhibit any color flops at all and may be produced by an economic process which is easily controllable and does not involve reduction steps or high temperatures.

Thus, the object of the present invention is to provide pigments which fulfil the aforementioned requirements, do not possess the detrimental effects of the pigments described in the prior art and may be produced in a simple wet coating process without involving any reduction steps, to provide an economic process for the production of these pigments, as well as their use.

The object of the present invention is achieved by deep bluish-black effect pigments, each pigment comprising
  a synthetically produced transparent dielectric flake-form substrate which has per se a green interference color and a refractive index n of greater than 1.5, and
  at least a layered structure consisting of
    a first layer composed of hematite and/or goethite, and
    a second layer composed of magnetite,
  on the flake-form substrate, wherein the second layer is located on top of the first layer and the first layer is located directly on the substrate.

In addition, the object of the present invention is achieved by a process for the production of deep bluish-black effect pigments, comprising the following steps:
  (a) dispersing a synthetically produced transparent dielectric flake-form substrate which has per se a green interference color and a refractive index n of greater than 1.5, in water,
  (b) adding a water-soluble iron (III) compound at a pH of between 2 and 4 and keeping the pH value constant, thereby precipitating a layer composed of hematite and/or goethite onto the surface of the substrate particles, (c) raising the pH to a value between 5.5 and 7.5 and adding a water-soluble iron (II) compound and a water-soluble iron (III) compound, and optionally also adding an aqueous solution of an aluminum compound, while keeping the pH value constant, thereby directly precipitating a magnetite layer, which does optionally comprise an aluminum compound, onto the surface of the substrate particles precoated in step (b), (d) optionally washing and filtering the resulting product and (e) drying at a temperature in the range of from >100° C. to 260° C.

Furthermore, the object of the present invention is achieved by the use of said effect pigments for pigmenting inks, lacquers, paints, varnishes, coating compositions, plastics, foils, paper, ceramics, glasses, for laser marking and for pigmenting pigment preparations of diverse solvent contents.

For coating compositions in technical applications providing an attractive black color, coloring effect pigments are requested which exhibit a deep black body color which is as neutral as possible and a bluish interference color without any greenish or reddish tinge (identified for instance by very small a*-values of less than ±1 and by b*-values which are as much as possible in the negative range in the L*a*b* color system when the color properties of the applied coating composition are measured). In addition, the color characteristics of the effect pigments in the applied state should advantageously be stable to the greatest possible extent at any measuring angle (i.e. no color-changing effect observable under varying viewing and/or measuring angles).

Thus, the present inventors were challenged by the request for providing effect pigments having a neutral deep black body color in combination with a bluish interference color which does not show reddish or greenish tinges, where the pigments must, in addition, fulfil the stability requirements for technical applications, in particular a good chemical and thermal stability.

Surprisingly, the present inventors did find out that effect pigments which are basically composed of a flake-form substrate particle and of an iron containing coating surrounding the substrate particle could exhibit the desired optical characteristics if special flake-form substrates particles are used.

These special substrate particles are transparent, synthetically produced flake-form substrate particles which per se already have a green inherent interference color and a refractive index n of greater than 1.5.

A substrate flake is regarded as transparent in the sense of the present invention if it essentially, i.e. to the extent of at least 80%, transmits incident visible light. In addition, the substrate flakes employed in accordance with the invention do not have an absorption color.

The substrate flakes employed in accordance with the invention are synthetically produced flake-form substrates of homogeneous composition which have an upper surface and a lower surface which form the principal surfaces of the respective flake and are arranged parallel to one another. Parallel in the sense of the present invention means not only parallel in the geometric sense, but also encompasses deviations in the positioning of the surfaces to one another compared with geometrical parallelism of up to 15°. The length or width of these principal surfaces of the respective substrate flake represents the particle size of the substrate flake in its respective longest dimension, while the separation between the substrate surfaces represents the geometrical thickness of the respective substrate flake.

Furthermore, the synthetically produced flake-form substrates employed in accordance with the invention have planar and very smooth surfaces. Due to the synthetic production of the substrate flakes, the surface properties, the geometrical thickness as well as the thickness distribution, the particle size and also the particle size distribution can be precisely controlled and set by means of the process parameters during the production of the substrate flakes, which cannot be ensured in the case of natural materials, such as, for example, mica, talc or kaolin, or even with synthetically produced mica, which are usually likewise used as substrate materials for effect pigments.

Due to the very planar, parallel surfaces of the substrate flakes, their homogeneous composition and the absence of an absorption color, the substrate flakes in a clear, transparent medium surrounding them having a refractive index which is different from the refractive index of the flakes, the flakes reflect at least 5% and up to 20%, in particular 6 to 20%, of the incident visible light, depending on the respective refractive index of the flakes. The reflected proportion of light here is greater the higher the refractive index of the respective flake material employed. This reflection at the respective interfaces with the ambient medium results, in combination with the path difference arising, in a monochrome interference of the reflected light beams and, thus, in an inherent interference color of the substrate flakes.

The substrate flakes employed in accordance with the invention have a green inherent interference color (light in the wavelength range from 490 to 570 nm), which is determined on the basis of the diffuse reflection or the total reflection of the substrate flakes in a transparent, colorless medium.

In order to determine this inherent interference color, a Hunter L*,a*,b* diagram is determined from the diffuse reflection determined with the aid of a corresponding Ulbricht sphere or the total reflection of incident visible light (sample: coating with a thickness of 10 μm on transparent PET film, comprising a commercially available transparent, colorless gravure printing binder and 10% by weight of substrate flakes). The reflection values for the substrate flakes according to the invention in the Hunter L*,a*,b* diagram here are in each case in the range L>30, in particular L=40 to 80, b=−20 to +20, in particular −10 to +10, and a <0, in particular a=−0.1 to −20, particularly preferably −0.1 to −10.

Conventional pigment substrates have either no or no predominantly visible and measurable monochrome interference color. Thus, mica flakes, irrespective of whether they are based on natural or synthetically produced mica, are not per se capable of interference of this type, which manifests itself as a uniformly perceptible, predominant, monochrome interference color, owing to their layer-wise structure of silicate layers and the consequently non-planar surfaces. Instead, mica flakes shimmer in various colors in case of a relatively large layer thickness distribution, which results in a whitish, undefined overall color impression in the case of a loose bed of pure mica flakes.

Under the prerequisite that the substrate flakes have planar and parallel substrate surfaces, the optical properties of the substrates employed in accordance with the invention are essentially determined by the refractive index of the substrate material and by the geometrical thickness of the substrate.

Due to the content of any foreign oxides present, but also due to included pores or depending on the crystal modification of the metal oxides preferably employed, the refractive index of the substrate material here may in some cases differ from the ideal refractive index of the pure substrate materials (bulk material, measured under standard conditions, for example by the Landolt-Börnstein method), meaning that the geometrical layer thickness of the substrates must be adapted correspondingly, depending on the production conditions and material used, in order to achieve the desired interference color.

To be able to obtain substrate thicknesses which are suitable for pigment preparation, the refractive index n of the substrate material should be at least greater than 1.5 and preferably at least 1.65. Suitable materials for the substrate are therefore dielectric materials or material mixtures in which the material or material mixture in each case has a refractive index n of greater than 1.5, preferably of at least 1.65.

Preference is given to colorless materials or material mixtures.

It is furthermore necessary for the substrate of the interference pigments according to the invention to have a refractive index $n_1$ which has a separation $\Delta n$ from the refractive index $n_2$ of an interference layer to be applied to the substrate of at least 0.1, better at least 0.2.

Suitable materials for the substrate of the interference pigment according to the invention are therefore, in particular, colorless metal oxides or also specific glass materials having a refractive index n in the range of from >1.5 to 2.5, in particular of from 1.65 to 2.5.

Particularly preferably suitable as substrate are substrate flakes which consist of $Al_2O_3$, of $Al_2O_3$ with a content of up to 5% by weight of $TiO_2$, based on the weight of the substrate, of $ZrO_2$ or of $TiO_2$, or substrate flakes which comprise $Al_2O_3$, $ZrO_2$ or $TiO_2$ with a proportion of at least 90% by weight, based on the weight of the substrate. $TiO_2$ here may be in the anatase or rutile modification.

Further constituents of the transparent substrate flakes may be the oxides or oxide hydrates of Sn, Si, Ce, Al, Ca, Zn, In and/or Mg, which, however, are present in the substrate at most with a proportion of 10% by weight, based on the weight of the substrate, and do not essentially determine the optical properties, in particular the interference color, of the substrate. In particular for substrates having a proportion of $Al_2O_3$ of at least 90% by weight, based on the weight of the substrate, oxides such as $SiO_2$, $SnO_2$, $In_2O_3$ or $Z_nO$ may be present as well, either singly or in combination of two or more thereof.

Suitable as substrate material are also glass flakes which meet the requirements of the refractive index. This is the case, in particular, for flakes comprising glass material whose proportion of $SiO_2$ is at most 70% by weight. In addition, glass materials of this type also comprise contents of $Al_2O_3$, CaO, MgO, $B_2O_3$, $Na_2O$, $K_2O$, $TiO_2$, ZnO, BaO, $Li_2O$, $ZrO_2$, $Nb_2O_5$, $P_2O_5$ and/or PbO in varying composition and varying proportions. Preference is given to high-refractive-index glass materials, such as flint glass and heavy flint glass.

Depending on the material employed, the substrate flakes which are suitable in accordance with the invention have a geometrical thickness in the range from 50 to 600 nm.

A prerequisite for suitability as pigment substrate is, in addition, that the substrates can be produced by synthetic means as planar flakes in the layer thickness desired in each case, which is, however, the case for the materials indicated. In addition, it is extremely advantageous if the pigment substrates employed in accordance with the invention are in crystalline form and particularly preferably in the form of single crystals, if applicable.

To be able to obtain a green inherent interference of the substrate flakes, substrate flakes comprising $Al_2O_3$ or comprising $Al_2O_3$ with a content of up to 5% by weight of $TiO_2$, based on the weight of the substrate, and substrate flakes which comprise $Al_2O_3$ with a proportion of at least 90% by weight, based on the weight of the substrate, have a geometrical thickness in the range of from 50 to 110 nm, of from 180 to 260 nm or of from 350 to 450 nm.

Substrate flakes comprising $TiO_2$ or those which comprise $TiO_2$ with a proportion of at least 90% by weight, based on the weight of the substrate, have in accordance with the invention a geometrical thickness in the range of from 110 to 170 nm or in the range of from 240 to 310 nm.

For substrate flakes which consist of $ZrO_2$ or substrate flakes which comprise $ZrO_2$ with a proportion of at least 90% by weight, based on the weight of the substrate, the geometrical thickness of the substrate is in accordance with the invention between 140 and 210 nm or in the range of from 260 to 400 nm.

Glass flakes which comprise a maximum of 70% by weight of $SiO_2$ have a geometrical thickness of 230 to 300 nm or of 400 to 470 nm.

The substrates employed are particularly preferably flakes comprising $Al_2O_3$ or comprising $Al_2O_3$ with a content of up to 5% by weight of $TiO_2$, based on the weight of the substrate, both of which are encompassed below by the term aluminium dioxide flakes, where the flakes have a geometrical thickness in the range of from 50 to 110 nm, of from 180 to 260 nm or of from 350 to 450 nm, preferably in the range of from 190 to 230 nm. As described below, these can be produced in the form of single crystals.

The standard deviation in the thickness of the individual substrate flakes here is preferably not more than 10%, based on the average of the respective substrate thickness. A relatively small thickness deviation of this type can be controlled via the respective production process.

The particle size of the substrate particles, which corresponds to the largest dimension of the substrate, is usually between 5 and 200 μm, in particular between 5 and 150 μm, mostly preferred between 7 and 100 μm and at best between 7 and 50 μm. $D_{50}$ values of from 12 to 25 μm are preferred. A narrow particle size distribution is in particular of advantage. The particle size distribution may be controlled either by the milling process, by the classification process, or by both, or, in the case of monocrystalline substrates, be the production process parameters.

The particle size and the particle size distribution can be determined by various methods which are usual in the art. However, preference is given in accordance with the invention to the use of the laser diffraction method in a standard method by means of a Malvern Mastersizer 3000, APA300 (product from Malvern Instruments Ltd., UK). This method has the advantage that particle size and particle size distribution can be determined simultaneously under standard conditions.

The particle size and the thickness of individual particles can in addition be determined with the aid of SEM (scanning electron microscope) images. In the case of the latter, particle size and geometrical particle thickness can be determined by direct measurement. To determine average values, at least 1000 particles are evaluated individually, and the results averaged. The form factor of the support flakes, i.e. the ratio of length or width to thickness, is generally from 2:1 to 1.000:1, in particular from 5:1 to 500:1 and very particularly preferably from 20:1 to 300:1.

According to the present invention, the deep bluish-black effect pigments have at least a layered structure on the substrate particles, which consists of a first layer composed of hematite and/or goethite and of a second layer composed of magnetite, wherein the first layer is located directly on top of the substrate and the second layer is located on top of the first layer (i.e. farther from the surface of the substrate particle).

The layered structure may be present merely on the two major surfaces of the substrate, but does, preferably, encapsulate the transparent substrate particles in such a way that all outer surfaces of the transparent flaky substrate are coated with the hematite/goethite-magnetite-layered structure. It goes without saying that the hematite/goethite-magnetite-layered structure does not have to exhibit the same thickness at each single point of the substrate surface and that even there may be some smaller surface areas of the substrate which are not perfectly coated with the layered structure or, at least with the hematite/goethite layer mentioned above. Limitations of this kind are due to technical production aspects and do not harm the intention of the present invention.

For the purpose of the present invention, the layer composed of hematite and/or goethite is called "hematite layer" thereafter. The actual composition thereof is dependent on the precipitation conditions used for the preparation thereof. For the conditions given in the process according to the present invention, the composition of the hematite layer has been revealed being preferably either of pure hematite (alpha $Fe_2O_3$, ferric oxide) or of hematite containing goethite (alpha FeO(OH), hydrated ferric oxide). Usually, the content of goethite is smaller than the content of hematite.

The layer composed of magnetite is called "magnetite layer" thereafter and is, in the case it is produced by the process according to the present invention, composed of either pure magnetite ($Fe_3O_4$) or of magnetite containing very small amounts of maghemite (gamma $Fe_2O_3$). In a preferred embodiment, the magnetite layer is composed of either pure magnetite containing an aluminium compound or of magnetite containing very small amounts of maghemite and an aluminium compound, as explained below.

For the optical characteristics of the pigments of the present invention it is very important that the thickness of the magnetite layer within the layered structure is larger than the thickness of the hematite layer. In fact, the thickness of the magnetite layer is much higher than the thickness of the hematite layer. Typically, the thickness of the magnetite layer within the layered structure is at least 15 fold the thickness of the hematite layer.

The hematite layer is coated onto the substrate particles with a very small layer thickness only, starting from a molecular monolayer and having an upper limit of about 10 nm. Usually, the thickness of the hematite layer is in the range of from 0.1 to 10 nm, preferably of from 2 to 8 nm. According to the present invention, the hematite layer may act as a binder for the magnetite layer which is to be coated on top of the hematite layer underneath. In addition, it provides a certain contribution to the absorption and interference colors of the resulting interference pigments in case its thickness is in the range of from 2 to 10 nm.

Furthermore, with respect to the aluminum dioxide flakes which may be used as substrate particles according to the present invention, the usually obtained outer surfaces of these particles are often not particularly useful for directly being coated with iron oxides at a rather lower acidic to neutral pH value as used for the direct coating of $Fe_3O_4$ according to the present invention.

Therefore, the thin hematite layer, which may in addition also act as a means for activating the surface of the substrate particles, is coated directly onto the substrate, since it might be directly precipitated with good success onto the aluminum dioxide flakes and provides an activated surface itself, which is of advantage for the precipitation of the following magnetite layer. Furthermore, the very smooth and planar surface of the substrate particles may be maintained by precipitating a dense and uniform, but ultra-thin hematite layer.

In addition, in case the underlying substrate contains $Al_2O_3$ crystals or is composed of these, the following hematite layer can form crystals in the same crystal structure as present in the underlying substrate, namely in the corundum crystal structure, which is of advantage for the formation of a dense hematite layer. In such a case, the growth of the hematite layer on the substrate which contains $Al_2O_3$ crystals or is substantially composed of these is like an epitaxial crystal growth process of a crystalline layer onto a solid substrate.

Still furthermore, the presence of the hematite layer is also advantageously useful for forming a dense, planar and substantially crystalline layer of $Fe_3O_4$ directly thereon by a precipitation procedure not using an oxidizing agent.

The hematite layer may contain a small amount of foreign metal ions different from iron which is due to traces in the iron compounds used for the production of the hematite layer.

From the prior art it was known that $Fe_3O_4$ layers could be formed in a reduction process with a hematite layer as the starting material. Following this reduction process, unevenness of the resulting layer should be expected, since non-regular reduction throughout the layer thickness of the former hematite layer (gradient) might occur. Furthermore, when using prior art precipitation methods, small crystallites of $Fe_3O_4$ and a rather loose crystal structure of the layer, which result if $Fe_3O_4$ is precipitated using Fe(II) compounds in the presence of an oxidizing agent at rather high (8 to 11) pH values, lead to non-lustrous pigments in the end.

To the contrary, the pigments according to the present invention exhibit a strong luster as well as a deep bluish-black appearance, which is substantially due to the interference and absorption behavior of the substrate as well as of the magnetite layer and, as mentioned above, to a certain extent also of the hematite layer.

In view of what is regarded as attractive black color in coating applications, the only useful interference color of the layer package, which does not detrimentally harm an attractive black appearance but is desired instead is a blue interference, since the color impression of a deep bluish-black is still the impression of a valuable black color. Therefore, a blue interference color of the present pigments in addition to a deep black absorption color is desired, but greenish or reddish tinges of this blue interference color shall be avoided.

Thus, not merely the layer thickness of the substrate particles has to be adjusted as described above, but also the layer thickness of the magnetite layer and, astonishingly, also the layer thickness of the hematite layer, although it is so thin that it does, per itself, not contribute to the interference of the pigment, but merely in combination with the other layers and the substrate, respectively. Nevertheless, the hematite layer provides a yellowish/reddish absorption color which, in combination with the greenish interference color of the substrate, leads to a neutral black absorption color of the resulting interference pigments and allows only a bluish interference color to be present in the end.

The magnetite layer of the layered structure of the pigments according to the present invention is present in a thickness of from 80 nm to 230 nm, in particular of from 80 nm to 150 nm. It is adjusted in such a way that a relatively strong bluish interference color of the resulting pigment is achieved (may be controlled by known means in the precipitation process for the magnetite layer).

The magnetite layer exhibits a dense and crystalline structure. The smoothness of the substrate particles may be maintained, so that the magnetite layer as such is also smooth, dense and planar. It exhibits a high refractive index of higher than 2.0 (about 2.4). Besides the bluish interference color, the magnetite layer does also impart, via its absorption, a black body color and an intense luster to the resulting pigments.

In addition, it is preferred that the magnetite layer comprises at least one aluminum compound, which is preferably an aluminum oxide and/or an aluminum oxide hydrate. To this end, an appropriate aluminum compound is added while the magnetite layer is precipitated onto the substrate particles pre-coated with hematite. Useful aluminum compounds are e.g. aluminum sulfates, aluminum chlorides or aluminum nitrates.

The aluminum content of the magnetite layer contributes to the optical behaviour of the magnetite layer and facilitates the precipitation of the following dielectric layer onto the magnetite layer, if present.

The aluminum oxide and/or aluminum oxide hydrate, as mentioned above, is present in the magnetite coating with a content of preferably between 0.1 and less than 5% by weight, based on the weight of the magnetite coating. They do not form mixed oxides with the iron component since their content is far too small. Instead, they are present as the aluminum oxide and/or oxide hydrate per se, e.g. as $Al_2O_3$ or AlOOH, in the magnetite coating.

Besides the fact that the following dielectric layer, if present, may be coated onto the magnetite layer much easier in the case that the magnetite layer comprises an Al-compound, the gloss of the resulting pigments may still be improved therewith.

Thus, the embodiment of the present invention where the magnetite layer comprises an aluminum compound as disclosed above is preferred.

In addition, or alternatively to aluminum, the magnetite layer may also comprise a small amount of foreign metal ions different from iron and aluminum. This is due to traces in the iron compounds which may be used for the production of the magnetite layer.

Most preferred is the embodiment of the present invention where the substrate material of the deep bluish-black effect pigment is an aluminum dioxide flake as defined above, having the layered structure as described above directly on the substrate and encapsulating the substrate, whereby the layered structure is composed of a first hematite layer and of a second magnetite layer, the latter farther from the substrate surface than the former and comprising an Al compound as defined above, followed by a colorless dielectric layer on top of the magnetite layer.

Preferably, at least one colorless dielectric layer on top of the hematite/magnetite layered structure is present in the pigments according to the present invention. In this case, a dielectric layer which is composed of a colorless, low refractive index dielectric material is located directly on top of the magnetite layer.

As material for these dielectric layers, dielectric metal oxide or metal oxide hydrates are generally used in the present invention. They are composed of colorless metal oxides or metal oxide hydrates or of their mixtures, e.g. of oxides or hydrates of Sn, Ce, Si, Zr and Al, such as tin oxide, cerium oxide, silicon dioxide, zirconium dioxide and aluminum dioxide, or the hydrates thereof.

In particular, a layer of silicon oxide and/or silicon oxide hydrate or a layer of tin oxide and/or tin oxide hydrate is present directly on top of the second layer (magnetite layer) of the layered structure described above. A layer of silicon oxide and/or silicon oxide hydrate is preferably used.

The thickness of the layer of silicon oxide and/or silicon oxide hydrate or a layer of tin oxide and/or tin oxide hydrate is in the range of from 1 to 15 nm, preferably of from 1 to 5 µm. In this case, although the desired bluish interference color provided by the magnetite layer is slightly diminished, the colorless dielectric layer is capable to provide a good thermal stability to the resulting interference pigments which is of importance when, in the application medium, the interference pigments are subject to any thermal treatment at higher temperatures, which might be the case in certain coating procedures. Silicon dioxide and/or silicon oxide hydrate is a dielectric material with a dense amorphous structure and is, therefore, very useful to protect the underlying magnetite layer and is, thus, preferably used.

Furthermore, the deep bluish-black effect pigments according to the present invention might in addition be adapted to their application requirements by further application of a so called aftercoating, different from the silicon dioxide/silicon oxide hydrate layer or in addition thereto. The aftercoating is in general the outermost coating of an interference pigment and may be composed of either inorganic or organic compounds or comprise a mixture of inorganic and organic components. In case of inorganic compounds, dielectric layers may be used as well. They are known to impart better dispersibility, light fastness, etc., to effect pigments of different kinds and are well known in the art. So-called aftercoatings based on inorganic dielectric compounds possess a thickness which is generally smaller than 20 nm and in particular between 1 and 15 nm, preferably between 2 and 10 nm. Dielectric layers of this type as such will not impart any interference to the whole pigment system. Here, very thin layers of silicon dioxide (here in layered systems with other aftercoatings), aluminum oxide, cerium oxide and/or tin oxide and the like are used, either as single components or in the form of mixtures. To this end, also several very thin dielectric layers of different materials as mentioned above, one on top of the other, are often used.

Of course, the colorless dielectric layer as well as layers for the improvement of the application properties may be used together within one embodiment of the present invention. In particular, the deep bluish-black effect pigments as mentioned above, namely the pigments consisting of an aluminum dioxide flake having a layered hematite/goethite-magnetite structure and a silicon dioxide/silicon oxide hydrate layer thereon, may be provided additionally with inorganic aftercoatings in order to impart better application properties in the respective application media to them.

In addition to or alternatively to inorganic dielectric layers for aftercoatings as described above, thin coatings of organic materials, e.g. of different organic silanes, organic titanates, organic zirconates, may also be applied as outermost coating to the surface of the pigments of the present invention to improve their application abilities in different application media. Such coatings are known in the art of effect pigments and their application is, therefore, within the ordinary skill of the person skilled in the art.

Examples for the so called "aftertreatment" or "aftercoating" of effect pigments, either of organic or of inorganic nature, which may be employed in the present invention as described above, may be found in the following documents: EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805; the content thereof shall be enclosed in the present invention by reference.

A further object of the present invention is a process for the production of the deep bluish-black effect pigments described above which is reliable, economic, easily controllable and does not involve a reduction step. Thus, the process comprising the following steps is applied:
 (a) dispersing a synthetically produced transparent dielectric flake-form substrate which has per se a green interference color and a refractive index n of greater than 1.5, in water,
 (b) adding a water-soluble iron (III) compound at a pH of between 2 and 4 and keeping the pH value constant, thereby precipitating a layer composed of hematite and/or goethite onto the surface of the substrate particles,
 (c) raising the pH to a value between 5.5 and 7.5 and adding a water-soluble iron (II) compound and a water-soluble iron (III) compound, and optionally also adding an aqueous solution of an aluminum compound, while keeping the pH value constant, thereby directly precipitating a magnetite layer, which does optionally comprise an aluminum compound, onto the surface of the substrate particles precoated in step (b),
 (d) optionally washing and filtering the resulting product, and
 (e) drying at a temperature in the range of from >100° C. to 260° C.

Suitable synthetically produced substrates having a green inherent interference color are the substrates already described above which are transparent and have a refractive index n in the range from >1.5 to 2.5 and in particular from 1.65 to 2.5, preferably substrate flakes which consist of $Al_2O_3$, of $Al_2O_3$ with a content of up to 5% by weight of $TiO_2$, based on the weight of the substrate, of $ZrO_2$ or of $TiO_2$, or substrate flakes which comprise $Al_2O_3$, $ZrO_2$ or $TiO_2$ with a proportion of at least 90% by weight, based on the weight of the substrate. Further constituents of the transparent substrate flakes may be the oxides or oxide hydrates of Sn, Si, Ce, Al, Ca, In or Zn, which, however, are present in the substrate at most with a proportion of 10% by weight, based on the weight of the substrate.

The glass flakes already described above which comprise up to 70% by weight of $SiO_2$ and further constituents are also suitable.

Depending on the material, the geometrical thicknesses of the substrates already described above must be complied with to be able to obtain a green inherent interference color of the substrate flakes.

The flake-form substrates described above, essentially consisting of $Al_2O_3$, can preferably be produced here by the process described in EP 763 573 A2. These substrates comprise small amounts of $TiO_2$, which simplifies the subsequent coating with interference layers. The aluminum oxide flakes produced by this process are obtained as single crystals in a crystal-growth process, in which the particle size of the substrates and their geometrical thickness, whose standard deviation is not greater than 10%, can be controlled by the process parameters. The corresponding influencing parameters are known to the person skilled in the art. If other foreign oxides are to be present instead of or in addition to $TiO_2$, the procedure is analogous to the process described in EP 763 573 A2 with replacement of the raw materials.

Substrate flakes which consist entirely or predominantly of $ZrO_2$, $TiO_2$ oxide hydrates thereof or mixtures thereof can be produced analogously to the process described in WO 93/08237. However, the substrate flakes produced analogously to this process should not comprise any dissolved or undissolved colorants. They are produced from the corresponding, preferably inorganic, precursor material in a belt process, in which the precursor is applied to the belt, converted into the oxidic form or the oxide hydrate using acid, solidified and subsequently detached from the belt and optionally calcined. The geometrical layer thickness of the substrate flakes is adjusted via the application amount or wet-layer thickness of the precursor layer, which is possible very precisely and results in a narrow thickness distribution with variations of at most 10%. The particle size of the substrate flakes must be adjusted via subsequent grinding and classification processes, but these are usual in the art.

Flake-form glass substrates are commercially available from diverse suppliers in various thicknesses and qualities, for example borosilicate (ECR) glass flakes in thicknesses of 100 to 500 nm from Glassflake Australia Pty Ltd.

For coating the flake-form substrate particles mentioned above with a hematite/magnetite layered structure according to the present invention, the following procedure is preferably applied:

The substrate particles are suspended in water. Preferably, the suspension is heated to a temperature of from 75° C. to 85° C. The pH value of the resulting suspension is adjusted to a value of between 2 and 4 and is kept constant. Thereafter, a water-soluble iron (III) compound is slowly metered into the suspension while keeping the pH value constant. After the addition of the soluble iron (III) compound is completed, whereby a thin layer composed of hematite and/or goethite is precipitated onto the surface of the substrate particles, the pH is raised to a value between 5.5 and 7.5 and kept constant, and a water-soluble iron (II) compound as well as a further water-soluble iron (III) compound is added to the suspension, either one by one or as a mixture, the latter is preferred. In the case that an aluminum compound should be incorporated into the magnetite layer which is preferred, the pH is preferably adjusted to a value between 6.5 and 7.5 and kept constant. Then, an aqueous solution of an aluminum compound is slowly metered into the suspension either prior to, or after, or, preferably, simultaneously with the iron (II) and iron (III) compounds, while keeping the pH value constant. The suspension is preferably kept under stirring for another 0.5 hours while keeping the pH value constant.

The first and the second water-soluble iron (III) compounds may either be the same or different compounds. Preferably, the same water-soluble compound is used for the first as well as for the second addition of an iron (III) compound. The amount for the addition of the first iron (III) compound is chosen in such a manner that merely a very thin hematite layer may be precipitated onto the surface of the substrate particles by using this iron (III) compound. The resulting layer thickness is in the range of from some molecular layers to about 10 nm, as described above. To the contrary, the amounts for the iron (II) compound as well as for the second iron (III) compound, which is added together with the iron (II) compound, are chosen in such a manner that the ratio between iron (II) ions and iron (III) ions is between 9:1 and 9.7:0.3, so that magnetite may be precipitated directly onto the surface of the pre-coated substrate particles. Although there is a larger excess of the iron (II) compound mentioned in advance, it must be mentioned that the iron (II) compound is partly converted into iron (III) oxide due to the process conditions, resulting in direct precipitation of magnetite.

Additionally, the amounts of the iron (II) compound and iron (III) compound used for generating the magnetite layer are chosen in such a manner that the layer thickness of the resulting magnetite layer is larger than that of the hematite layer. Preferably, the amounts are chosen so that the resulting layer thickness of the magnetite layer is at least 15 fold the layer thickness of the hematite layer. Since the density of the hematite layer is very similar to the density of the magnetite layer (5.24 g/cm$^3$ vs. 5.17 g/cm$^3$), the rule of thumb applies that about approximately $5 \times 10^{-3}$ g of hematite or magnetite is needed to coat a layer thickness of about 1 nm of either material onto 1 m$^2$ of the respective substrate.

In general, the following water-soluble iron compounds may be used: $FeSO_4$, $FeCl_2$, $Fe(NH_2)_2(SO_4)_2$, $Fe(NO_3)_2$, $Fe_2(SO_4)_3$, $FeCl_3$, $FeNH_4(SO_4)_2$ or $Fe(NO_3)_3$; $FeSO_4$ and $Fe(NO_3)_3$ being particularly preferred.

In more detail, as water-soluble iron (II) compound, preferably $FeSO_4 \cdot 7\,H_2O$ may be used. As water-soluble iron (III) compound, $Fe(NO_3)_3 \cdot 9\,H_2O$ is preferably used. These compounds can be used in industrial grade form, so that a small amount of metal ions other than Fe ions may be present as well.

As already mentioned earlier, it is of great advantage for the interference pigments of the present invention if an aluminum compound is included in the magnetite layer. Such an Al-compound improves the facility to overcoat the magnetite layer with further dielectric layers as mentioned above and enhances, in addition, stability and denseness of the magnetite layer. Useful Al compounds are water-soluble Al salts such as $AlCl_3$ and $Al_2(SO_4)_3$, in particular $AlCl_3 \cdot 6\,H_2O$, $Al_2(SO_4)_3 \cdot 16\,H_2O$ or poly aluminum chloride solution (PAC). This compound may be simply mixed with the iron (II) and iron (III) compounds mentioned above in an appropriate ratio, and then slowly applied to the suspension of the substrate particles already been pre-coated with the hematite layer. The conditions for the addition of the Al-compound are described above.

After the precipitation of the magnetite layer is completed, the resulting pigment is separated off, optionally washed, and dried. Drying takes place at a temperature in the range of from larger than 100° C. to 260° C., in particular of from 110° C. to 140° C. The time for the drying step is between 0.5 and 12 hours.

Optionally, the resulting pigments may then be classified to further limit the particle size distribution thereof.

Preferably, the process described above is executed in an inert gas atmosphere, for example using nitrogen, argon or the like.

In a preferred embodiment of the present invention, the deep bluish-black effect pigments contain at least one colorless dielectric layer on top of the hematite/magnetite-layered structure, i.e. on top of the magnetite layer, the dielectric layer(s) providing the required thermal stability to the underlying pigment.

To this end, at least one further dielectric layer is coated onto the magnetite layer once the hematite/magnetite layered structure has been applied onto the substrate particles. Coating of these additional dielectric layer(s) may, preferably, be accomplished prior to the drying step mentioned above, although an intermediate drying step is also possible.

Optionally, a washing and/or filtering step may be executed after coating each dielectric layer onto the pre-coated substrate particles.

The material for the dielectric layer is preferably chosen of dielectric metal oxides and/or metal oxide hydrates. Preferably, in case there is merely one single dielectric layer applied onto the magnetite layer, the single dielectric layer is preferably composed of a colorless, low refractive index dielectric material. Most preferred is the application of a single dielectric layer of silicon dioxide and/or silicon oxide hydrate or tin dioxide and/or tin oxide hydrate that is located directly on top of the magnetite layer. Silicon dioxide and/or silicon oxide hydrate is most preferred.

Depending on the thickness of the low refractive index dielectric layer on top of the magnetite layer, the bluish interference color generated by the underlying pigment may be slightly diminished but is still maintained to an acceptable extent. The resulting pigments exhibit a deep black body color in combination with a visible bluish interference color without any reddish or greenish tinge, a high hiding power as well as strong luster. No angle dependent interference colors (color flop) may be observed. In addition, the resulting interference pigments exhibit a good thermal stability.

Regarding the formation of a dielectric layer on the magnetite layer of the present pigments, the procedures generally known in the art of pearlescent pigments and effect pigments may be employed. Wet chemical coating procedures are preferred, and particularly preferred are wet chemical coating methods using inorganic starting materials, since these processes are easy to handle and to control, leading to encapsulated particles per se.

In general, wet coating methods for coating the pigment particles with dielectric layers, in particular with dielectric metal oxide or metal oxide hydrate layers, are performed as follows: The pigment particles are suspended in water, and one or more hydrolysable metal salts are added at a pH value which is appropriate for hydrolysis and is chosen in such a manner that the metal oxides or metal oxide hydrates are precipitated directly onto the platelets without any instances of secondary precipitation. The pH value is kept constant usually by simultaneous metered addition of a base and/or acid. Subsequently, the pigments are separated off, washed and dried and, if desired, calcined.

In the process for the production of the pigments according to the present invention, the calcination step is completely omitted for the layered hematite/magnetite structure as well as for all dielectric layers which are coated onto said hematite/magnetite layered structure. This is because the magnetite layer would be destroyed by applying high temperatures as generally used in calcination steps.

For the sake of completeness, the coating of dielectric layers can also take place in a fluidized-bed reactor by means of gas-phase coating, in which it is possible, for example, to make appropriate use of the techniques proposed in EP 0 045 851 and EP 0 106 235 for preparing pearl lustre pigments. But the wet coating methods as described above are clearly preferred.

Using the wet chemical methods described above, for instance, the coating of the pigment particles being pre-coated with the hematite/goethite-magnetite layered structure with a silicon dioxide layer and/or a silicon oxide hydrate layer may be accomplished with a procedure as described in the following: A potassium or sodium silicate solution is metered into a suspension of the material that is to be coated and heated to about 50-100° C. The pH value is held constant at about 6-9 by simultaneous addition of a dilute mineral acid, such as HCl, HNO$_3$ or H$_2$SO$_4$. As soon as the desired layer thickness of SiO$_2$ has been reached, the addition of the silicate solution is terminated. The batch is subsequently stirred for about 0.5 h. Depending on whether silicon dioxide or silicon oxide hydrate should be achieved, the drying and/or calcination of the resulting layer is exhibited at moderate or higher temperatures, preferably of about 120° C. or higher.

Next, further dielectric layers may be applied on top of the first dielectric layer which serve as further protecting layers regarding the application media of the pigments and are so called aftercoating layers, not being capable to impart or to diminish interference colours to the resulting pigments. These inorganic dielectric layers as well as organic protecting layers, which may also be applied thereon, have been described earlier to some extent. The corresponding methods are known in the art as well.

The deep bluish-black effect pigments of the present invention having the characteristics mentioned above, lend themselves to the use in application media, which in particular rely on deep black colors and high luster, especially automotive applications, technical coating applications in general or printing media. Of course, they may also be applied in further applications where black pigments are generally useful.

Therefore, one object of the present invention is solved by the use of the deep bluish-black effect pigments according to the present invention for pigmenting inks, paints, varnishes, coating compositions, namely liquid coating compositions and powder coating compositions, plastics, foils, paper, ceramics, glasses, for laser marking and for pigmenting pigment preparations of diverse solvent contents.

Especially preferred is their use in automotive paints, automotive coating compositions and automotive lacquers, respectively.

Printing inks may include, depending on the actual particle size of the deep bluish-black interference pigments, all kinds of printing inks which are usually used in printing operations, including screen printing inks, gravure printing inks such as intaglio printing inks, offset printing inks, flexographic printing inks as well as ink jet printing inks, to name only a few.

Although applicable in almost all technical applications having a need for saturated black colors of high attractivity, the effect pigments of the present invention are most preferably useful in automotive applications, namely in automotive paints, automotive coating compositions and automotive lacquers. Besides the effect pigments according to the present invention, the respective compositions comprise at least one binder which is customary for automobile applications, and optionally at least one solvent.

The conventional OEM coating compositions, as employed as standard in the industry, can be used here as vehicle. Depending on the coating method used and other factors, 1-component solvent borne types, 2-component solvent borne types, 1-component water borne types or powder types are suitable here.

Depending on the coating system selected, various binder systems and crosslinking agents are employed as standard. Usually, acrylate/melamine-based binder systems, acrylate/melamine/silane-based binder systems or binder systems based on carbamate/melamine are useful, but epoxy resins and polyurethanes may be used as well.

The solids content of the various solvent- and water-borne coating systems is between 40 and about 65% in the case of solvent-borne systems and approximately between 35 and 45% in the case of water-borne systems. In the case of powder coatings, the solids content is 100%.

The automotive paints, lacquers or coating compositions may of course also comprise the conventional assistants and additives which are usually present in automotive applications. Besides the requisite crosslinking agents, these are, for example, UV absorbers, HALS (hindered amine light stabiliser) components and additives for degassing, improving the flow behaviour, improving the scratch resistance, improving the adhesion capacity, and the like.

The automotive paints, lacquers or coating compositions comprising the effect pigments of the present invention are advantageously used in the color providing base coat of a multi-layered coating system. On top of the base coat, usually a clear coat is applied.

The resulting coating comprising a base coat can be a single-layered or a two-layered base coating. Preference is given to a single-layered base coating. The base coating comprises all main substances and assistants usually employed for this purpose, in particular absorption pigments for an opaque coating beneath the clear coat. The base coating does also comprise the deep bluish-black effect pigments of the present invention to provide a saturated black body color with bluish interference, high gloss and good hiding power to the substrate panels of the vehicle.

The substrates panels employed for the coating with a base coat are bodies or body parts of automobiles which have been pre-treated in the usual manner (for example e-coat, filler), which usually consist of metals, plastics or composite materials. These are provided with a base coat in a known manner by means of the conventional means and plants.

In general, the pigments of the present invention may be applied to any product which can take advantage of one of the characteristics of the present pigments, i.e. their coloristic or their magnetic properties, which they also exhibit, or both.

It goes without saying that the deep bluish-black effect pigments according to the present invention may be used in combination with organic as well as inorganic colorants and pigments and, in particular, with effect pigments of any kind. Organic pigments and colorants are, for example monoazo—pigments, disazo pigments, polycyclic pigments, cationic, anionic or non-ionic colorants. Inorganic colorants and pigments are, for example white pigments, colored pigments, further black pigments or effect pigments. Examples for appropriate effect pigments are metal effect pigments, pearlescent pigments or interference pigments, which are in general based on singly or multiply coated platelets of aluminum, mica, glass, Al$_2$O$_3$, Fe$_2$O$_3$, SiO$_2$, etc. Examples for the structure and particular characteristics of these pigments are disclosed, inter alia, in RD 471001 or RD 472005, the disclosure thereof shall be included in the present specification by reference.

In addition, further colorants which may be used in combination with the present deep bluish-black effect pigments are luminescent colorants and/or pigments of any type as well as holographical pigments or LCPs (pigments based on liquid crystal polymers).

The pigments according to the present invention may be used in any desired mixing ratio with commonly used and commercially available pigments and fillers. Limitations for the use of the present pigments with other pigments and colorants are merely set in case that any mixture would disturb or limit the coloristic properties of the pigments according to the present invention.

The effect pigments according to the present invention provide a neutral deep black body color as well as a desired bluish interference color to the respective application medium. In addition, they are lustrous, exhibit a good hiding power and, provided with respective protective layers, also a good temperature stability without losing the desired bluish interference color. Furthermore, the bluish interference color is not overturned by reddish or greenish interference effects. According to their valuable color characteristics, they may be used in all application media which may take advantage thereof.

The present invention is described in more detail in the following examples, but should not be limited to these.

EXAMPLE 1

140 g of an aluminum dioxide flake ($Al_2O_3$ with minor content of $TiO_2$, mean thickness 220 nm, mean particle diameter 18 μm, greenish inherent interference color) is suspended in deionized water. The suspension is heated to 80° C. while stirring. Nitrogen gas is slowly added into the reaction vessel. The pH value is adjusted and kept constant to 3.0 by metering an acidic compound into the suspension (HCl, about 20 wt. %). While keeping the pH value constant, a $Fe(NO_3)_3$ solution (100 ml, 7.87 g of $Fe(NO_3)_3*9\ H_2O$ in 140 ml deionized water) is added to the suspension. The pH value is then raised to about 7.0 by adding a basic composition (NaOH, about 32 wt. %) to the suspension. While keeping the pH value constant, an aqueous solution of an Al component and of a Fe (II) and Fe (III) component (2000 ml, 768.9 g $FeSO_4*7\ H_2O$, 0.66 g $AlCl_3*6\ H_2O$ and 24.3 g $Fe(NO_3)_3*9\ H_2O$, in 2000 ml deionized water) is slowly metered into the suspension which is then kept for another 30 minutes while stirring. Thereafter, a water glass solution (about 5.9 g, 29% as $SiO_2$) is added while keeping the pH constant. The suspension is kept for about 2 hours, then the resulting pigments are separated off by filtering and washed with deionized water.

Eventually, the resulting pigments are dried at a temperature of about 120° C. and sieved.

The resulting pigment exhibits a deep bluish-black powder color with vivid luster as well as high hiding power.

EXAMPLE 2

For demonstrating the influence of the thickness (and, thus, an inherent interference color) of the flake-form pigment substrates, aluminium oxide substrate particles of different thickness are coated with a layered system of hematite/goethite-magnetite according to the procedure disclosed in example 1 to give different interference pigments. The respective substrates have a mean thickness of 300, 220 and 150 nm, respectively, where only the substrate particles having a mean thickness of 220 nm exhibit an inherent greenish interference color.

Three polymer plates which are pre-coated with a 15 μm thick coating containing carbon black are spray coated with a coating composition containing a mixture of 10 parts by weight of acrylic-melamine-resins as binder, 1 part by weight of the respective interference pigments exhibiting the different substrate thickness as described above, and 13 parts by weight of a solvent mixture in each case. If necessary, the viscosity of the coating composition is further adjusted by adding additional solvents for spray application. The coating composition is applied to the pre-coated polymer plates at a dry thickness of 15 μm by means of a commercially available spray gun. Afterwards, a clear top coat substantially composed of an acrylic-melamine resin (applied by spray application in dissolved form) is applied on the layer containing the interference pigments at a dry thickness of 30 μm. The respective coated test plates are thermally treated at 140° C. for 20 minutes.

The test plates are evaluated visually and by measuring the coloristic data. The respective L*a*b* data measured by a BYK-mac i (spectrophotometer of BYK-Gardner GmbH) are disclosed in table 1.

TABLE 1

| Flake thickness (nm) | Measuring angle | L* | a* | b* | C* | h° |
|---|---|---|---|---|---|---|
| 300 | 15 | 42.8 | −1.8 | −4.3 | 4.7 | 254.7 |
| 300 | 25 | 19.5 | −0.2 | −4.1 | 4.2 | 266.8 |
| 300 | 45 | 5.4 | 0.1 | −4.9 | 4.9 | 270.6 |
| 220 | 15 | 43.4 | −0.2 | −11.3 | 11.3 | 268.9 |
| 220 | 25 | 20.6 | 0.1 | −7.4 | 7.4 | 270.8 |
| 220 | 45 | 4.9 | 0.2 | −5.1 | 5.1 | 272.6 |
| 150 | 15 | 45.2 | −3.4 | −4.3 | 5.5 | 231.7 |
| 150 | 25 | 24.9 | −1.9 | −3.7 | 4.1 | 243.1 |
| 150 | 45 | 6.5 | −0.5 | −4.0 | 4.0 | 263.3 |

The color characteristics according to table 1 reveal that only for the deep bluish-black effect pigment according to the present invention, having flake-form substrates with a green inherent interference color, the color angle h° remains stable at different measuring angles, the bluish interference is strong (negative b*-value) and a reddish or greenish tinge of the interference color (tiny a*-value) is not observable.

EXAMPLE 3

Temperature Stability Test

Pigment samples are prepared according to example 1, with the proviso that the following conditions are met:

Ex. 3a: only with hematite/goethite-magnetite layered structure, no dielectric layer;

Ex. 3b: with hematite/goethite-magnetite layered structure, dielectric layer of $SiO_2$ and/or silicon oxide hydrate;

Ex. 3c: with hematite/goethite-magnetite layered structure, dielectric layer of $SiO_2$ and/or silicon oxide hydrate plus standard aftercoating;

Ex. 3d: mica with magnetite layer, comparative example 2 g of each pigment are stored at 180° C. for 14 hours 2 g of each pigment are stored at 250° C. for 14 hours.

1.2 g of each pigment according to ex.3a to ex. 3d after storage are dry blended with 30.0 g of a commercial powder clear coat composition. The pigmented powder coating composition is then applied onto black/white metal test panels by means of a corona charging powder gun. The resulting coating layer is cured at 180° C. for 15 min. in each case.

After curing, the panels are characterized visually and by measuring the corresponding L*a*b* values using a BYK-mac i spectophotometer. Using the data achieved, mDE*-values are determined over the black and white surface of the test panels. The results are disclosed in table 2.

TABLE 2

|  | mDE* over white 180° C. | mDE* over white 250° C. | mDE* over black 180° C. | mDE* over black 250° C. |
|---|---|---|---|---|
| Ex. 3a | 7 | 28.5 | 4 | 16 |
| Ex. 3b | 2 | 14.5 | 1 | 3.5 |
| Ex. 3c | 2 | 3 | 2.5 | 2.5 |
| Ex. 3d | 9 | 27 | 7 | 22 |

The results disclosed in table 2 show that a dielectric $SiO_2$ and/or silicon oxide hydrate layer on top of the hematite/goethite-magnetite layered structure of the effect pigments according to the present invention enlarges the temperature stability of the pigments to a remarkable extent. The temperature stability may be enlarged even further in case a standard aftercoating is applied in addition to the $SiO_2$ and/or silicon oxide hydrate dielectric layer.

The invention claimed is:

1. Deep bluish-black effect pigments, each pigment comprising
    a synthetically produced transparent dielectric flake-form substrate which has a green interference color and a refractive index n of greater than 1.5, and
    at least a layered structure consisting of
       a first layer composed of hematite and/or goethite, and
       a second layer composed of magnetite,
    on the flake-form substrate, wherein the second layer is located on top of the first layer and the first layer is located directly on the substrate;
    wherein the transparent dielectric flake-form substrate is a glass flake having an $SiO_2$ proportion of at most 70% by weight, or wherein the transparent dielectric flake-form substrate consists of $Al_2O_3$, of $Al_2O_3$ with a content of up to 5% by weight of $TiO_2$, based on the weight of the substrate, or of $ZrO_2$ or of $TiO_2$, or
    wherein the transparent dielectric flake-form substrate comprises $Al_2O_3$, $ZrO_2$ or $TiO_2$ with a proportion of at least 90% by weight, based on the weight of the substrate;
    wherein the flake-form substrate has a particle size of 5 µm to 200 µm;
    wherein the first layer has a geometrical thickness of 8 to 10 nm;
    wherein the second layer has a geometrical thickness of 80 to 230 nm;
    and
    wherein the effect pigments are deep bluish-black effect pigments.

2. The effect pigments according to claim 1, wherein the transparent dielectric substrate consists of $Al_2O_3$ or of $A_2O_3$ with a content of up to 5% by weight of $TiO_2$, based on the weight of the substrate, and has a geometrical thickness of 50 to 110 nm.

3. The effect pigments according to claim 1, wherein the flake-form substrate has a particle size of 7 µm to 50 µm.

4. The effect pigments according to claim 1, wherein the second layer has a geometrical thickness of 80 to 150 nm.

5. The effect pigments according to claim 1, wherein the second layer comprises an aluminium compound.

6. The effect pigments according to claim 1 comprising furthermore a colorless dielectric layer on top of the second layer.

7. The effect pigments according to claim 6, wherein the colorless dielectric layer is a layer of silicon dioxide and/or silicon oxide hydrate.

8. The effect pigments according to claim 1, comprising an outermost inorganic and/or organic aftercoating.

9. The effect pigments according to claim 1, wherein the transparent dielectric substrate consists of $Al_2O_3$ or of $Al_2O_3$ with a content of up to 5% by weight of $TiO_2$, based on the weight of the substrate, and has a geometrical thickness of 180 to 260 nm.

10. The effect pigments according to claim 1, wherein the transparent dielectric substrate consists of $Al_2O_3$ or of $Al_2O_3$ with a content of up to 5% by weight of $TiO_2$, based on the weight of the substrate, and has a geometrical thickness of 350 to 450 nm.

11. A product selected from the group consisting of pigmenting inks, lacquers, paints, varnishes, coating compositions, plastics, foils, paper, ceramics, glasses, and laser marking pigments, comprising the effect pigments of claim 1.

12. The product according to claim 11, which is an automotive lacquer, automotive paint or automotive coating composition.

13. A process for preparing the deep bluish-black effect pigments according to claim 1, comprising the following steps:
    (a) dispersing a synthetically produced transparent dielectric flake-form substrate which has a green interference color and a refractive index n of greater than 1.5, in water,
    (b) adding a water-soluble iron (III) compound at a pH of between 2 and 4 and keeping the pH value constant, and precipitating a layer composed of hematite and/or goethite onto the surface of the substrate particles,
    (c) raising the pH to between 5.5 and 7.5 and adding a water-soluble iron (II) compound and a water-soluble iron (III) compound, and optionally also adding an aqueous solution of an aluminum compound, while keeping the pH value constant, and directly precipitating a magnetite layer, which does optionally comprise an aluminum compound, onto the surface of the substrate particles precoated in step (b),
    (d) optionally washing and filtering the resulting product, and
    (e) drying at a temperature of >100° C. to 260° C.

14. The process according to claim 13, wherein the transparent dielectric substrate consists of $Al_2O_3$ or of $Al_2O_3$ with a content of up to 5% by weight of $TiO_2$, based on the weight of the substrate, and has a geometrical thickness of 50 to 110 nm, of 180 to 250 nm or of 350 to 450 nm.

15. The process according to claim 13, which is executed in an inert gas atmosphere.

16. The process according to claim 13, wherein after performing step (c) and prior to performing step (e), in an additional step a colorless dielectric layer is coated onto the magnetite layer.

17. The process according to claim 16, wherein the colorless dielectric layer coated onto the magnetite layer is a layer of silicon dioxide and/or silicon oxide hydrate.

18. The process according to claim 13, wherein the layer composed of magnetite is applied onto the substrate particles at a higher thickness than the layer composed of hematite and/or goethite.

19. Deep bluish-black effect pigments, each pigment comprising
    a synthetically produced transparent dielectric flake-form substrate which has a green interference color and a refractive index n of greater than 1.5, and at least a layered structure consisting of
a first layer composed of hematite and/or goethite, and
a second layer composed of magnetite,
on the flake-form substrate, wherein the second layer is located on top of the first layer and the first layer is located directly on the substrate;
wherein the transparent dielectric flake-form substrate is a glass flake having an $SiO_2$ proportion of at most 70% by weight, or wherein the transparent dielectric flake-form substrate consists of $Al_2O_3$, of $Al_2O_3$ with a content of up to 5% by weight of TiO2, based on the weight of the substrate, or of $ZrO_2$ or of $TiO_2$, or wherein the transparent dielectric flake-form substrate comprises $Al_2O_3$, $ZrO_2$ or $TiO_2$ with a proportion of at least 90% by weight. based on the weight of the substrate;
wherein the flake-form substrate has a particle size of 5 μm to 200 μm;
wherein the first layer has a geometrical thickness of 6 to 10 nm;
wherein the second layer has a geometrical thickness of 80 to 230 nm;
and
wherein the effect pigments are deep bluish-black effect pigments.

* * * * *